(12) United States Patent
Zhu et al.

(10) Patent No.: US 11,077,888 B2
(45) Date of Patent: Aug. 3, 2021

(54) UTILITY VEHICLE TRAY SYSTEM

(71) Applicant: Berreny Pty Ltd, Baulkham Hills (AU)

(72) Inventors: Min Zhu, Baulkham Hills (AU);
Geoffrey Hung, Baulkham Hills (AU);
Troy Marinier, Baulkham Hills (AU)

(73) Assignee: Berreny Pty Ltd, Baulkham Hills (AU)

( * ) Notice: Subject to any disclaimer, the term of this patent is extended or adjusted under 35 U.S.C. 154(b) by 44 days.

(21) Appl. No.: 16/071,045

(22) PCT Filed: Jan. 17, 2017

(86) PCT No.: PCT/AU2017/050030
§ 371 (c)(1),
(2) Date: Jul. 18, 2018

(87) PCT Pub. No.: WO2017/124140
PCT Pub. Date: Jul. 27, 2017

(65) Prior Publication Data
US 2020/0406985 A1    Dec. 31, 2020

(30) Foreign Application Priority Data
Jan. 18, 2016  (AU) .............................. 2016900142

(51) Int. Cl.
  *B62D 33/023*  (2006.01)
  *B62D 33/02*   (2006.01)
  *B60R 9/06*    (2006.01)

(52) U.S. Cl.
  CPC ............ *B62D 33/0207* (2013.01); *B60R 9/06* (2013.01); *B62D 33/023* (2013.01)

(58) Field of Classification Search
  CPC ....... B60R 11/06; B60R 9/06; B62D 33/0207; B62D 33/033; B62D 33/00; B62D 33/02;
  (Continued)

(56) References Cited

U.S. PATENT DOCUMENTS 5,359,954 A * 11/1994 Kordelin .................. B63B 5/06
                                                              114/85
5,470,120 A * 11/1995 Christensen .............. B60R 9/00
                                                             224/405

(Continued)

FOREIGN PATENT DOCUMENTS

AU      2016301118 A1    3/2018
AU      2017210347 B2    9/2019
(Continued)

OTHER PUBLICATIONS

International Search Report and Written Opinion for PCT/AU2017/050030 dated Mar. 10, 2017.
(Continued)

*Primary Examiner* — Corey N Skurdal
(74) *Attorney, Agent, or Firm* — Banner & Witcoff, Ltd.

(57) ABSTRACT

A utility tray system including a coaming member located on each of two opposing sides of a tray body, each coaming member having at least one longitudinally extending channel, the channel having a longitudinally extending channel opening in communication with a longitudinally extending channel body, the channel body being wider in cross-section than the channel opening;

wherein the channel body is adapted to receive a fastener which has a portion that is larger in cross sectional area than the channel opening, thereby preventing the fastener from being withdrawn from the channel opening;

further wherein the fastener can be selectively secured to the coaming member at a selected longitudinal position.

20 Claims, 7 Drawing Sheets

(58) Field of Classification Search
CPC ... B62D 33/0215; B62D 33/0222; B60P 7/08; B60P 7/135
See application file for complete search history.

(56) References Cited

U.S. PATENT DOCUMENTS

| | | | |
|---|---|---|---|
| 6,585,465 | B1 | 7/2003 | Hammond et al. |
| 7,575,264 | B1* | 8/2009 | Solomon ............... B60P 7/0815 296/183.1 |
| 7,758,091 | B1* | 7/2010 | McCall ..................... B60P 3/40 296/3 |
| 7,874,774 | B2 | 1/2011 | Peterson |
| 8,496,281 | B2* | 7/2013 | Thygesen ............... B62D 33/02 296/26.12 |
| 8,985,921 | B2 | 3/2015 | McCloud |
| 9,493,123 | B2 | 11/2016 | Martin |
| 9,937,962 | B1* | 4/2018 | Tyler .................... B62D 27/065 |
| 2002/0048495 | A1 | 4/2002 | Anderson et al. |
| 2005/0236867 | A1 | 10/2005 | McNulty et al. |
| 2007/0110539 | A1 | 5/2007 | Klinkman et al. |
| 2008/0143133 | A1 | 6/2008 | Nichols |
| 2008/0209839 | A1* | 9/2008 | Amato .................. E04F 19/061 52/588.1 |
| 2008/0211218 | A1 | 9/2008 | Booher |
| 2013/0038087 | A1 | 2/2013 | Woodard, Jr. |
| 2018/0022398 | A1* | 1/2018 | Schlaupitz ............... B60R 9/00 224/405 |

FOREIGN PATENT DOCUMENTS

| | | |
|---|---|---|
| CN | 104773216 A | 7/2015 |
| WO | 2017015726 A1 | 2/2017 |

OTHER PUBLICATIONS

Notification of Transmittal of International Preliminary Report on Patentability for PCT/AU2017/050030 dated May 14, 2018.
AI-1 Printout from the 2020 site www.tomma.com, 6 pages.
AI-2 Printout from the 2020 site https://aluminiumindustries.com.au/, 6 pages.
AI-3 Printout from the 2020 homepage https://comtruk.com.au/, 6 pages.
AI-4 Printout from the Wayback machine for Nov 2014 https://comtruk.com.au/, 10 pages.
AI-5 Printout from the Wayback machine for Jan 2007 https://www.tascom.com/comtruk_welcome.htm, 1 page.
AI-8 2020 printout from Wikipedia on Pickup trucks and history downloaded from https://en.wikipedia.org/w/index.php?title=Pickup_truck&oldid=996535574, 7 pages.
AI-9 2020 printout from Wikipedia on Panel vans and history downloaded from https://en.wikipedia.org/w/index.php?title=Panel_van&oldid=996137589, 9 pages.
AI-10 Printout from youtube with publication date Jun. 14, 2010 for Cargo Management https://www.youtube.com/watch?v=Vba2OaMNuf0, 1 page.
AI-11 MPEG-4 video Cargo Management https://www.youtube.com/watch?v=Vba2OaMNuf0.
AI-12 Printout from youtube with publication date May 26, 2007 for Ford F150 Cargo Management System, https://www.youtube.com/watch?v=NPOPF45E5Ns, 1 page.
AI-13 MPEG-4 video Ford F150 cargo management https://www.youtube.com/watch?v=NPOPF45E5Ns.
AI-14 Printout from youtube with publication date Apr. 17, 2015 for 2015 Nissan Titan—Utili-track Channel System, https://www.youtube.com/watch?v=yjznF_Uc00Y, 1 page.
AI-15 MP4 video Nissan Utili-track https://www.youtube.com/watch?v=yiznF_Uc00Y.
AI-16 Printout from youtube publication date Feb. 19, 2014 for L-Track accessories, https://www.youtube.com/watch?v=vcos-X1bYiM&t=2s, 1 page.
AI-17 MPEG-4 video L-track accessories https://www.youtube.com/watch?v=vcos-X1bYiM&t=2s.
AI-18 2020 Amazon shop listing for S-track, Pit posse, available Mar. 17, 2011, 9 pages.
AI-19 Photograph S-pit posse, 1 page.
AI-20 Printout Sprinter Source forum—Jan 2016, https://sprinter-source.com/forums/index.php?threads/44508/, 17 pages.
AI-21 Printout from Amazon for the Steadymate 15545 Series L Track Recessed Mount rails, available Apr. 2009, https://www.amazon.com/au/Steadymate-15545-Track-Recessed-Mount/dp/B0026FCGFE/ref=cm_cr_arp_d_pl_foot_top?ie=UTF8, 4 pages.
AI-22 Sprinter Adventure van blog of Oct. 21, 2015, https://sprintervanusa.com/2015/10/21/adding-sound-and-heat-insulation-to-the-floor/, 2 pages.
AI-23 Dec. 30, 2010 article regarding the installation of cargo rails in a load bed of a Land Rover defender, funrover.com/tips-guides/load-bed-with-cargo-rail-for-land-rover-defender/, 8 pages.
AI-24 Image of T-track, 1 page.
AI-25 Image of double cut T-track, 1 page.
AI-26 Article T-track, Popular Woodworking Magazine, published Aug. 30, 2008, https://www.popularwoodworking.com/projects/t-track/#:~:text=T-track is a versatile,%2C stops and hold-downs.,8 pages.
AI-27 Jan. 2012 blog article depicting installation on Yakima tracks on gunwales of pickup truck., https://www.rackattack.com/blog/2008-ford-f150-fx4-crewcab-bed-rack/, 3 pages.
AI-28 Yakima installation manuals for products available in 2012 from AI-27, 25 pages.
AI-29 2020 Wikipedia T-slot structural framing, https://en.wikipedia.org/wiki/T-slot_structural_framing, 2 pages.
AI-30 2014 Wikipedia T-slot structural framing, https://en.wikipedia.org/w/index.php?title=T-slot_structural_framing&oldid=591630896, 2 pages.
AI-31 Printout from youtube with publication date Oct. 26. 2015 for 80/20 Inc.: Product Basics, https://www.youtube.com/watch?v=GwMoF_UQQ28, 1 page.
AI-32 MPEG-4 video 80/20 Inc Basics https://www.youtube.com/watch?v=GwMoF_UQQ28.
AI-33 Printout from Wikipedia for Nov. 2012 80/20 website catalogue of frame profiles, https://web.archive.org/web/20121113221640/http://www.8020.net/T-Slot-5.asp, 3 pages.
AI-34 T-slot frame and glass image, 1 page.
AI-35 2015 Wayback machine for AME website, http://amesystem.com.au/products/profile/40-Series-Aluminium-Profiles-Page-1.aspx, 1 page.
AI-36 2013 AME frame profile brochure, 2 pages.
AI-37 2013 Wayback machine for T-slot CNC, http://www.cncshop.com.au/index.php?main_page=index&cPath=48, 1 page.
AI-38 Jan. 15, 2015 Wayback machine for Modular components site, https://www.modularcomponents.com.au/building-blocks/, 2 pages.
AI-39 2015 Wayback machine for Modular components frames, https://web.archive.org/web/20150301013010/http://www.modularcomponents.com.au/building-blocks/profiles-5/, 2 pages.
AI-40 2015 Wayback machine for Modular components T-nut, http://www.modularcomponents.com.au/building-blocks/t-slot-nuts/, 3 pages.
AI-41 2012 Wayback machine for 8020.net website publication list, https://web.archive.org/web/20121113221541/ http://www.8020.net/made_with_8020_stuff_asp, 1 page.
AI-42 Images 32 & 33 from Made with 80/20 stuff vol. 1, 1 page.
AI-43 Images 26,27,44 & 45 from Made with 80/20 stuff vol. 2, 2 pages.
AI-44 Made with 80/20 stuff vol. 1 and Made with 80/20 stuff vol. 2, 52 pages.
AI-45 Search and pontoon boat photograph from 80/20 Pinterest downloaded from https://www.google.com/search?q=80%2F20+frame+pontoon+boat&oq=80%2F20+frame+pontoon+boat&aqs=chrome..69i57joi131i433j35i3912joi ..., 3 pages.
AI-46 80/20 Inc Pinterest page with pontoon boat of AI-45, https://www.pinterest.com/au/8020stuff_created/, 7 pages.
AI-47 Boat figures with named parts, 3 pages.

(56) References Cited

OTHER PUBLICATIONS

AI-48 Macquarie Dictionary Coaming, https://www.macquariedictionary.com.au/features/word/search/?search_word_type=Dictionary&word=coaming, 2 pages.
AI-49 Feb. 3, 2014 Drop side removal tray forum discussion, https://4x4earth.com/forum/index.php?threads/drop-side-trays.28963/, 4 pages.
AI-50 Sep. 2014 forum regarding removing ute drop sides, https://www.woodworkforums.com/archive/index.php/t-188160.html, 2 pages.
AI-51 Associated ladder rack examples, downloaded from https://vertirack.com/Sprinter Van Ladder Racks.htm and https://www.duratray.netau/racks-bars/ and https://www.ebay.com.au/itm/Tub-Rack-Ladder-Roof-fit-Ranger-All-Ute-Multifunction-4WD-4x4-Steel-Carrier-Cage4293788609723, 10 pages.
Declaration by Matthew Keen dated Jan. 4, 2021 filed in *Berreny Pty Ltd* vs. *Aluminium Industries Investments Pty Ltd.*, Australian Patent Application 2017210347.

\* cited by examiner

UTILITY VEHICLE TRAY SYSTEM

TECHNICAL FIELD

The present disclosure relates to a utility vehicle tray system. In particular, the present invention relates to a utility vehicle tray system which provides improved load carrying and securement for both recreational and commercial applications.

BACKGROUND OF THE INVENTION

Utility vehicles, commonly referred to as "utes" are widely used for recreational and light commercial applications. Achieving load security at safe work load limits is a significant issue in regards to safety of loads on utility tray bodies. Loose loads are typically carried on tray bodies by securing the load firmly against the load deck or headboard, relying on friction to prevent the load shifting. Additional securement is attained with sideboard gates, and tailgates that enclose the sides of the tray body.

However, most utility tray bodies have little or limited infrastructure for securing loads and equipment. This is typically achieved through the provision of tie-down lashing points, external mounting points without direct line-of-sight with the load, or alternatively with locations that require proprietary equipment.

The limited mounting methods, locations and cost-effectiveness of load security potentially leads to inadequate restraint of loose loads as end users are limited in capability and suitable equipment. Additionally, externally mounted rope rails are generally not effective for use with typical or low lying loads with sideboard and tailgates in place.

In particular, the load securing rope or strap must pass over the sideboard panel that does not provide sufficient strength to prevent distortion, often leading to permanent deformation which affects structural integrity of the sideboard and/or tailgate. The deformation of the sideboard and/or tailgate generates slack in the load strap, leading to the loss of friction, potentially leading to load shift or ejection of loads from the load deck area.

Often universal accessories such as lights, auxiliary power units and outlets, antennae's, toolboxes and cases, and other accessories are fitted to utility tray bodies by means of drilling into structural members to secure universal equipment. In some instances this affects structural integrity of critical load bearing components, such as the headboard ladder loops, and sideboard panels and requires individual skill where components are typically mounted. Additionally, permanent fixture points are left behind after the accessory has been removed or replaced over the lifespan of the utility tray body, affecting resale value of the vehicle.

Toolboxes and large container bodies are often mounted to utility tray bodies, some unique and custom. The toolboxes and containers are typically independent bodies that are mounted onto the load deck, and do not utilise pre-existing structural elements. As per universal accessories, such toolboxes and large container bodies therefore require drilling into structural components of the tray, potentially affecting structural integrity. Furthermore, such mounting configurations generally do not permit further reconfiguration of the tray. Such mounting methods may not support the required heavy loads which they support and this can devalue the utility body and vehicle. Additionally, the add-on accessories and toolboxes are not of integral design to the tray, typically requiring custom-built equipment that cannot be adapted to other purposes.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a utility tray system comprising:

a coaming members each located on each of two opposing sides of a tray body, each coaming member having at least one longitudinally extending channel, the channel having a longitudinally extending channel opening in communication with a longitudinally extending channel body, the channel body being wider in cross-section than the channel opening;

wherein the channel body is adapted to receive a fastener which has a portion that is larger in cross sectional area than the channel opening, thereby preventing the fastener from being withdrawn from the channel opening;

further wherein the fastener can be selectively secured to the coaming member at a selected longitudinal position;

wherein the at least one channel comprises a first channel disposed in a raised portion of the coaming member that extends upwardly above a deck surface of the tray body, the first channel having a first channel opening facing upward and outwardly from the raised portion of the coaming member.

Preferably, the at least one channel comprises a second channel having a second channel opening that faces sideways toward a longitudinal centreline of the tray body.

Preferably, the utility tray system further comprises two sideboard panels each located on each of the two opposing sides of the tray body and outside of each of the coaming members.

Each of the channels preferably has a cross-sectional profile generally in the form of an isosceles trapezoid, a shorter side of two parallel sides of the trapezoid defining the channel opening.

A longitudinally extending rectangular groove is preferably located beneath a base side of the trapezoid.

Preferably, each of the side board panels has one or more corresponding like channels.

The sideboard panel preferably has a first side and a generally parallel second side, wherein one channel is formed in the first side and two channels are formed in the second side.

Two channels are preferably located adjacent to each other on the first and second sides adjacent to an edge of the sideboard panel, furthest from a pivot edge of the sideboard panel.

Preferably, the at least one channel comprises a third channel having a third channel opening facing downward.

The utility tray system further preferably comprises a ladder rack, the ladder rack having two ribs as a central support member, each of the ribs having a mounting portion adapted to be secured to one of the channels of one of the coaming members.

The ladder rack central support member preferably includes a first ladder rack channel.

The ladder rack central support member preferably includes a second ladder rack channel on an opposing side of the ladder rack central support member relative to the first ladder rack channel.

The utility tray system further preferably comprises an engagement mechanism adapted to be selectively isolated longitudinally relative to the channel.

The engagement mechanism preferably includes a channel nut adapted to be located within the channel, the channel nut having a cross sectional profile in the form of an isosceles trapezoid, having two angled faces, wherein a surface of the channel nut corresponding to a shorter side of two parallel sides of the isosceles trapezoid of the cross-sectional profile is located between the two angled faces includes a threaded hole adapted to receive a bolt, and the bolt is adapted to extend through the channel opening.

The engagement mechanism preferably includes a plow bolt, whereby a threaded stem portion of the plow bolt extends through the channel opening, and a head portion of the plow bolt is wider than the channel opening.

The utility tray system further preferably comprises a tray deck, the tray deck being defined by a plurality of interlocking tongue and groove boards.

The sideboard panel is preferably removable from the utility tray system.

The sideboard panel is adapted to engage with the channel(s) formed on the side board panels with two trestle frames to define a work bench.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

A utility tray system 100 is disclosed herein. The utility tray system 100 is intended to provide improved load security, maintaining a safe work limit with the mounting of accessories and equipment, and improved resale value of the tray structure.

Figure 7:
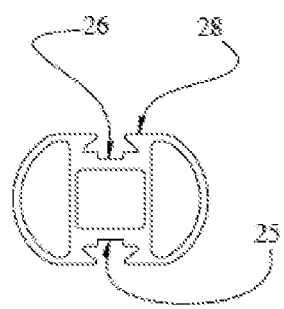
FIG. 7 is an end view of a headboard loop of the utility tray system of FIG. 1.
Figure 8:
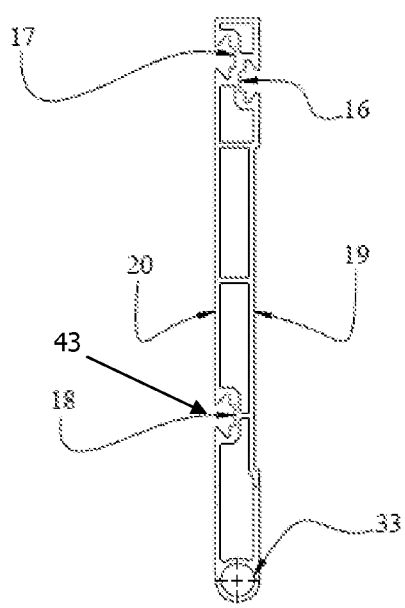
FIG. 8 is an end view of a sideboard panel of the utility tray system of FIG. 1.
Figure 9:
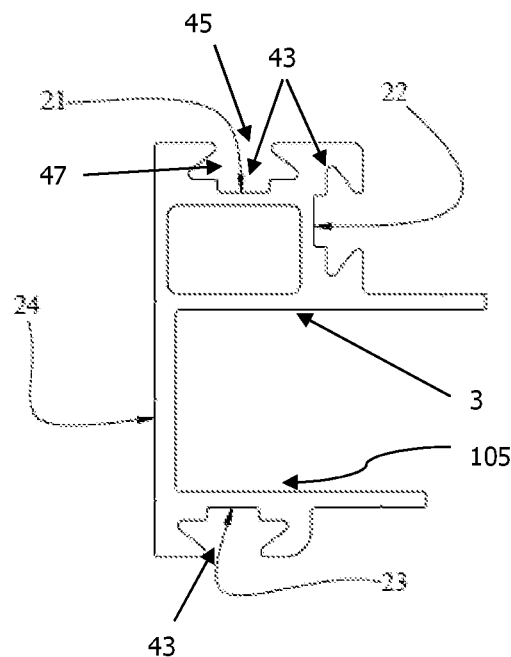
FIG. 9 is an end view of a side coaming member of the utility tray system of FIG. 1.

The utility tray system 100 incorporates a universal style non-discreet track or channel into structural extrusion elements of the utility tray system 100. Referring to FIGS. 7 to 9 for example, extrusions of the utility tray system 100 such as the sideboard panel 1, coaming member 3, removable tailgate 2, front headboard panel 5, and headboard loop 4 each have a longitudinally extending, recessed channel or track 43, and the dimensions of the channels 43 are common to each of the aforementioned members. As such, the channels 43 provide a securement mechanism which will be described in more detail below.

The components are generally fabricated from aluminium, although it will be appreciated they may be fabricated from other materials.

Figure 11:
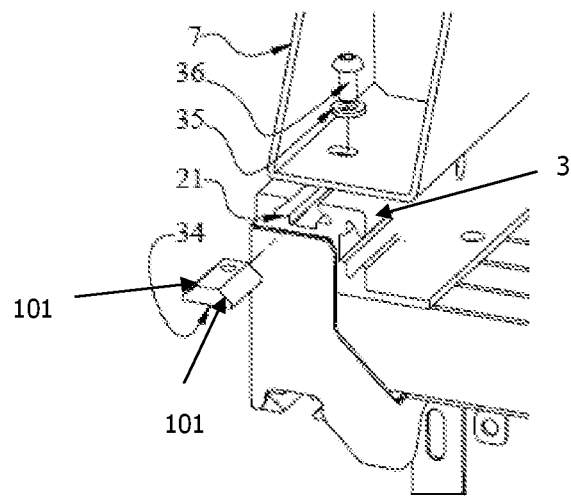
FIG. 11 is an exploded view of the mounting system for securing an adjustable ladder rack of FIG. 10.

The channels 43 each have a channel opening 45 located on a surface of the extruded component. The channel opening is in communication with the channel body 47. The width of the channel 43 tapers outwardly within the extruded component, thereby having a cross-sectional profile generally in the form of an isosceles trapezoid, with an additional rectangular groove located beneath the base side of the trapezoid. This is best seen in FIG. 11. Furthermore, the upper, side of the trapezoid, being the shorter of the two parallel sides of the trapezoid, defines the longitudinal channel opening 45.

Figure 13:
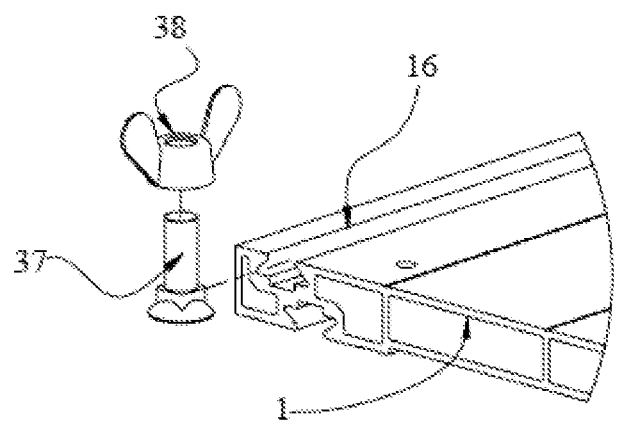
FIG. 13 is an exploded perspective view of the components of the table conversion kit of FIG. 12.

The tapering cross-sectional profile of the channels 43 enables countersunk head plow bolts 37 to be inserted in the channel 43, such that the threaded stem of the bolt 37 projects from the channel opening 45, as depicted schematically in FIG. 13. In this arrangement, the tapering, countersunk head of the plow bolt 37 abuts against the tapering walls of the channel 43, and prevents the bolt 37 from being removed along its longitudinal axis. For example, when a wing nut 38 is fastened to the thread of the plow bolt 37, the wing nut 38 applies an axial force to the stem of the plow bolt 37, thereby frictionally isolating the plow bolt 37 relative to the channel 43. In contrast, when the wing nut 38 is released, the plow bolt 37 is free to move longitudinally within the channel 43. Generally, the plow bolt 37 can only be removed from the channel at each of the ends of the channel 43.

Referring to FIG. 11, a channel nut 34, can also be used with the channel 43. The channel nut 34 has a cross sectional profile in the form of an isosceles trapezoid, having angled faces 101, 102. The upper surface includes a threaded hole adapted to receive a bolt 36. A ring bolt could be used.

As described above, the channel 43 can receive either the head of a plow bolt 37, or a channel nut 34. This provides at least two different alternatives for mounting components to the channels 43. This enables typical anchor accessories to be mounted at selective and moveable locations along the length of the extrusions.

Advantageously, the utility tray system 100 takes advantage of partial or complete construction of the utility tray body from aluminium extrusion profiles, the track or channel 43 system is incorporated into the profile of the aluminium extrusion to minimise joints and cost.

Figure 3:
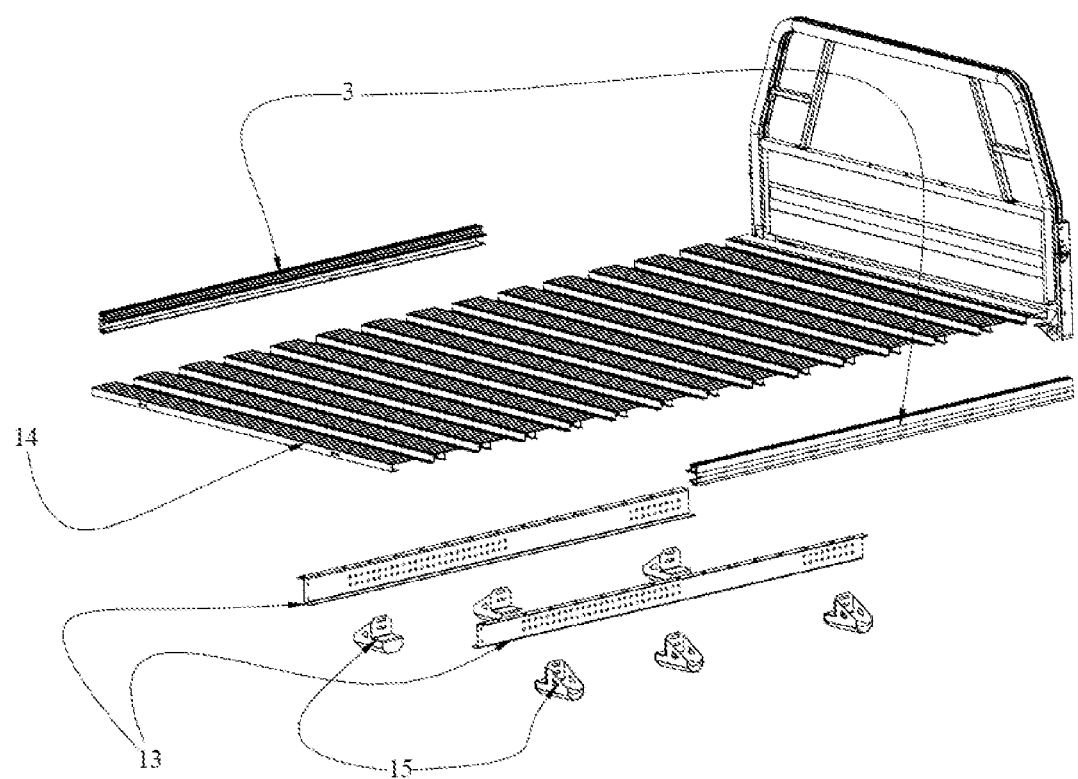
FIG. 3 is an exploded view showing a portion of the utility tray system of FIG. 1.
Figure 4:
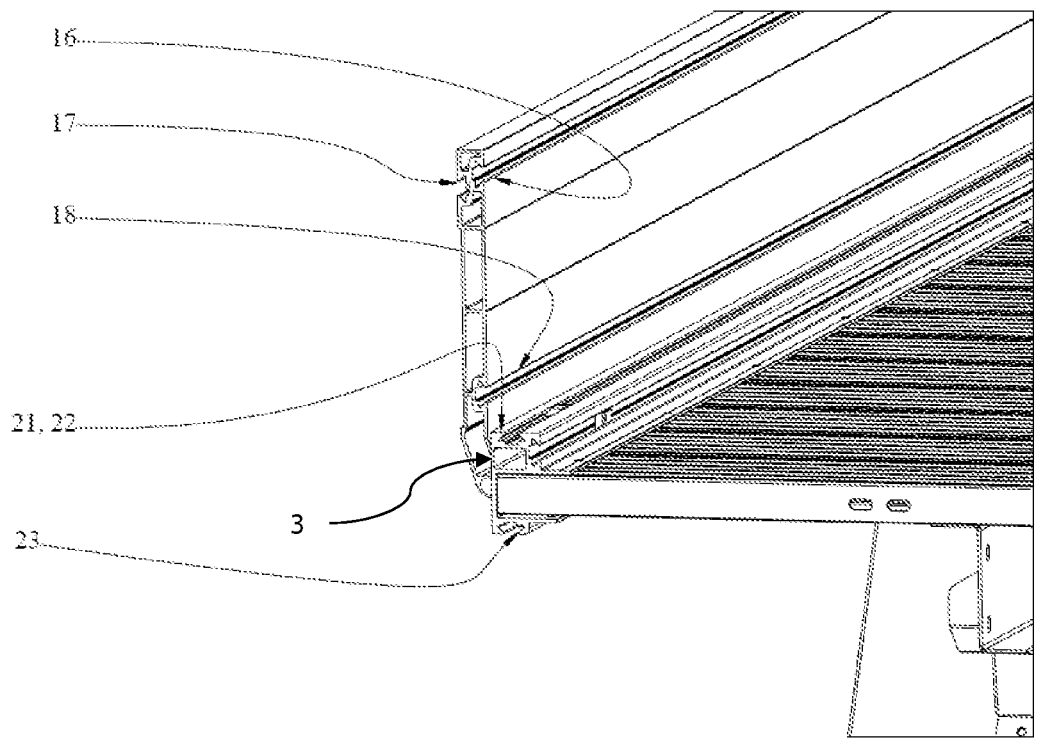
FIG. 4 is a detail showing a portion of the sideboard panel and base of the utility tray system of FIG. 1.

Referring in particular to FIG. 9, and also FIGS. 3, 4 and 11, the utility tray system 100 includes side coamings member 3 of the load deck defined by an aluminium extrusion. The coaming members 3 are mounted around the perimeter of the tray deck 12.

Each coaming member 3 has a generally U shaped recess 105. The coaming member 3 includes a side surface 24 which defines the external side of the utility tray, which the sideboard panel 1 abuts against when in a locked position. The coaming member 3 includes two channels 21, 22, which are directed generally perpendicular to each other. When assembled to the vehicle, the channel 21 is directed upwardly, and the channel 22 is directed perpendicularly and laterally toward the centre of the utility tray bed.

The coaming members 3 also includes a channel 23 which is directed downwardly as shown in FIG. 9.

Referring to FIG. 8, the sideboard panel 1 includes three of the channels, 16, 17 and 18. Furthermore, the lower edge of the sideboard panel 1 includes a longitudinally extending hole 33 for a gudgeon pin type hinge (depicted in FIG. 15).

The removable sideboard panel 1, removable tailgate 2, front headboard panel 5, and headboard loop 4 each incorporate the track or channel 43 system into the aluminium extrusion part.

The integration of the track or channel 43 profile in the form of the channels 43 permits the mounting of universal accessories of varying sizes and lengths in numerous locations. This provides the ability to secure loose loads in a flexible manner that suits the shape of the load with a direct tie-down path, and the ability to mount additional panels that permit the transformation of the tray into another configuration such as a canopy and or a tray with high sideboard panel walls.

The track system permits flexibility without affecting the structural integrity of the utility tray body system, by removing the process of drilling through structural material or components. Additionally, the resale value of the vehicle is not significantly reduced, as future reconfiguration of the utility tray body system is not affected.

The tray deck 12 may be provided with auxiliary equipment and optional accessories, but not limited to, tail lamps 6, mudguards 11, fixed load rest with handle 8, adjustable load rest 9, rope rails 10, rear ladder racks 7, and cabin protection systems 27. Such auxiliary accessories can be mounted to the non-discreet universal track.

The track or channel 43 location is preferably provided at locations that permit the mounting of typical accessories including lights, antennae's, auxiliary power outlets, load restraint points, toolboxes, canopies, drawers, racks, tanks, eyelets and not limited to load stoppers. This includes integrating the track into the headboard loop extrusion 4, within the load deck and the underside of the coaming members 3. Additionally, the track or channel 43 location will permit the mounting of numerous proprietary equipment and accessories such as table mounts, ramp mount, and overhead racking systems.

The track or channel 43 profile location is optimised toward the extremity to permit extension of the cross section profile, as to provide multiple-purpose functionality to transform the structure to another configuration. The preference of the location is biased at the top and bottom of the sideboard panel 1 to permit stacking of additional panels above this panel, so as to provide basis to transform the configuration of the structure without permanent mounting.

The track or channel 43 profile permits a channel nut 34, or plow bolt 37 to slide along the length of the extrusion, and has two flanges to hold the channel nut 34 or the head of the plow bolt 37. Preferably, such is incorporated but not limited to sideboard panel 1, headboard loop 4, and side coaming member 3 of the load deck 12.

As shown in FIG. 8, the sideboard panel 1 has a track or channel 43 profile located on both flat faces 16, 17, 18.

The side coaming members 3 have track or channel 43 profiles located inboard of the sideboard panel 21, 22, and also a track available outboard as well 23.

Preferably the headboard loop 4 contains a track profile 25, 26, with a flat section 28 of the profile for mechanical clamping of accessories.

Figure 6:
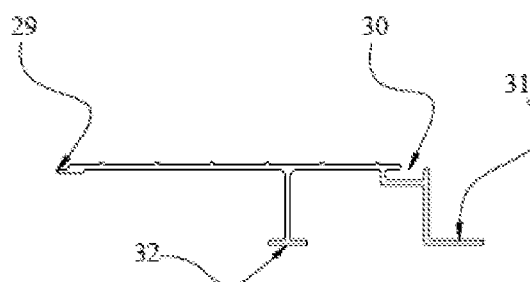
FIG. 6 is an end view of an extruded floor board of the utility tray system of FIG. 1.

Referring to FIG. 6, to prevent failures of the load deck 12 with the additional track system, the floor plank profile features an additional rib and foot 32 to improve load capacity, and prevent deformation and failure with increased use of ratchet strap tie downs. This is shown in FIG. 6.

Referring to FIG. 8, to prevent deformation in the sideboard 1 and tailgate panels 2, and permit structural transformation into a work bench and tailgate ramp, the extrusion profile preferably has both an inner and outer skin 19, 20. The two layers of skin are separated by multiple closed loop hollow profiles between the two skins 19, 20. One profile preferably has a profile to integrate the gudgeon pin hinge 33. Advantageously, the double layer design acts to improve stiffness for use of the tracks or channels 43, improve retaining of payload, use as a detachable ramp or work bench and to prevent deformation under straps mounted to rope rails. Additionally the integration of the hinge profile replaces the use of fastened hinges and removes joints that may deform under loading.

Design Variations

The base utility tray system 100 will be made available in a number of length and widths that will permit use with relevant light commercial utility vehicle models and styles. Different lengths of the tray body will be offered for the different utility cabin styles, such as single cab, extra cab or king cab, and dual cab or crew cab.

Figure 1:
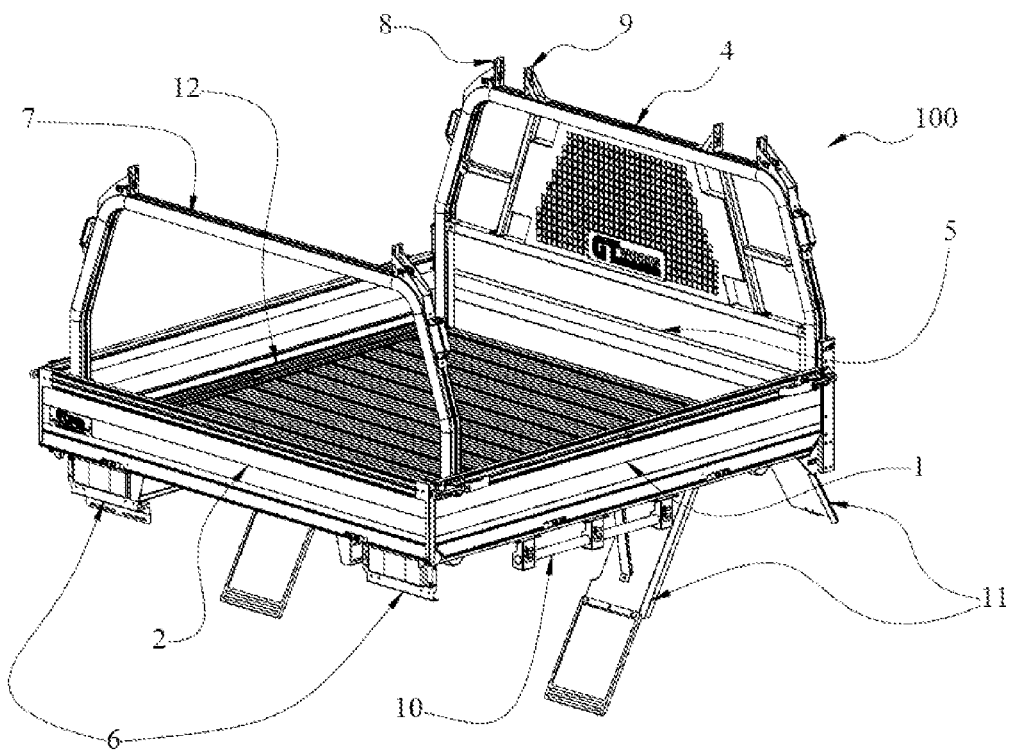
FIG. 1 is a rear perspective view of a utility tray system according to the present invention.

FIG. 1 shows an example of the utility tray system 100 having a number of components in a preferred arrangement of the utility tray deck load area 12, sideboard panels 1, tailgate 2, front headboard loop 4 and front headboard panel 5. Typical auxiliary components are affixed to the system including tail lamp 6, rear ladder rack 7, fixed load rest with handle 8, adjustable load rest 9, rope rail 10, and mudguard 11.

Figure 2:
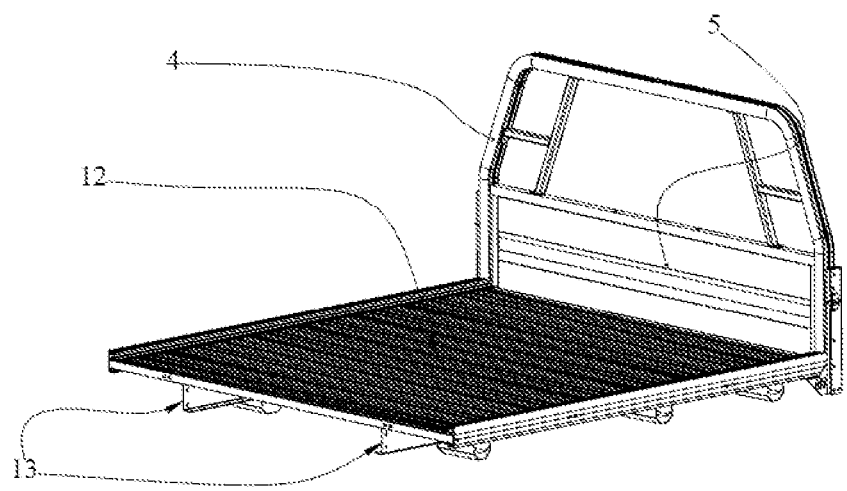
FIG. 2 is a rear perspective view of the utility tray system of FIG. 1 with the sideboard panels and rear gate removed.

FIG. 2 shows the preferred makeup of the structural components of the utility tray deck, including the headboard loop 4, headboard panel 5, load deck platform 12, and load deck load bearer 13.

FIG. 3 identifies key structural components related to the utility tray system 100 in an exploded assembly view. Side coaming extrusions 3 that feature the integrated track or channel 43 are mounted on the sides of the tongue and groove inter-locking floor planks 14. A load deck load bearer 13 carries the longitudinal load, and is secured to pedestal mounts 15 that are affixed to the vehicle chassis mounts.

FIG. 4 is a close-up of the side coaming 3 and sideboard 1 components in the assembly, without the tailgate 2 in position. The sideboard 1 upper inboard track 16, and upper outboard track 17 are shown to be positioned toward the extremity of the side board panel 1. The lower sideboard inboard track 18 is located facing the load deck platform area 12. Side coaming inboard tracks 21, 22 are shown located inboard of the edge of the load area, and of the sideboard panel 1. The side coaming 3 external track 23 is shown to be outside of the load deck area, and preferably facing downward.

Figure 5:
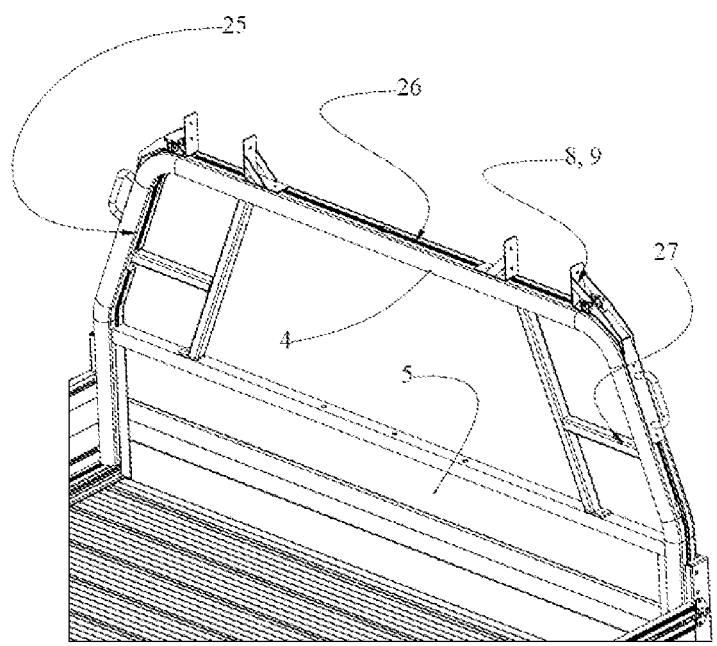
FIG. 5 is a rear perspective view of a front end ladder rack of the utility tray system of FIG. 1.

FIG. 5 is a close-up of the headboard panel 5 and loop 4 with the location of the inboard facing track 25, and outboard facing track 26. Notably some auxiliary components are mounted, including the fixed load stopper with handle 8 and adjustable load stopper 9 to the outboard facing track, and the cabin protection component 27 to the inboard facing track.

FIG. 6 shows an extrusion design of the floor plank with additional rib with foot rest 32 that increases the section stiffness along the length of the extrusion for additional capacity of the tie-down channels 43 located in the side coaming 3. A tongue 29 and groove 30 system is employed to provide inter-locking of each plank to create a flat deck surface, while the mounting foot 31 connects the plank to the side coaming 3 and load deck load bearer 13.

FIG. 7 shows the preferred sectional extrusion design for the headboard loop 4, and the requirement of a flat section 28 for a clamping surface on the profile for the track system to work effectively. An inboard channel or track 25 and outboard channel or track 26 are located on opposing faces of the profile.

Figure 15:
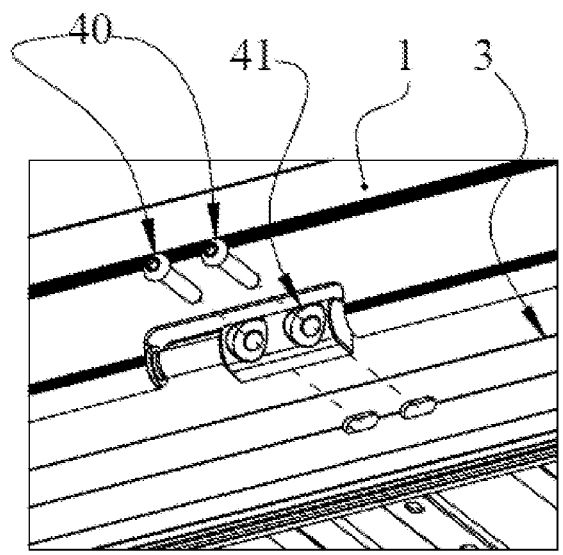
FIG. 15 is a perspective detail depicting how the sideboard panel is pivotally mounted.

FIG. 8 shows the preferred sectional extrusion design of the sideboard panel 1, preferably with channels or tracks 43 located on the upper inboard facing area 16, upper outboard facing area 17, and lower inboard facing area 18 of the profile to permit fitment of additional panels at the extremities, and accessories. Notably in this configuration, a gudgeon pin hole 33 is located on the lower point to permit a rotational joint of the panel in place of externally fastened hinges typical of other systems. The gudgeon pin hinge 41 is depicted in FIG. 15.

A double skin panel, inner skin 19 and outer skin 20, with closed sections between the two faces that attain a higher stiffness that prevents bending under straps secured to the outboard side of the utility tray body system 100.

FIG. 9 shows the preferred sectional extrusion design of the side coaming 3 with the track system located on the top face 21 and a side facing track 22 for load carrying within the confines of the tray deck, inboard of the sideboard panels 1. The channel or track 43 is also located on the bottom face 23 that permits mounting of external accessories such as rope rails, eyelets, and other accessories. A flat, external face 24 is located on the outboard side to provide a flat mounting area for the sideboard gudgeon pin (shown in FIG. 15).

Figure 10:
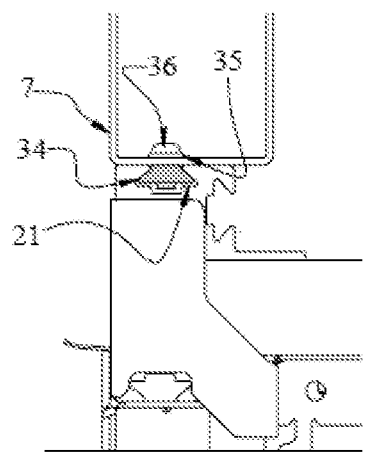
FIG. 10 depicts a mounting system for securing an adjustable ladder rack to the utility tray system of FIG. 1.

FIG. 10 shows a method of securing the adjustable ladder rack 7 to the side coaming 3 top face track 21, utilising a channel nut 34, washer 35 and screw 36. The screw and nut provide a clamping force onto the side coaming 3 profile to provide load security. The method can be applied to various accessories and equipment and is not limited to the adjustable ladder rack 7.

FIG. 11 is an exploded view of the components utilised for securing the ladder rack 7 or other equipment as per FIG. 10.

Figure 12:
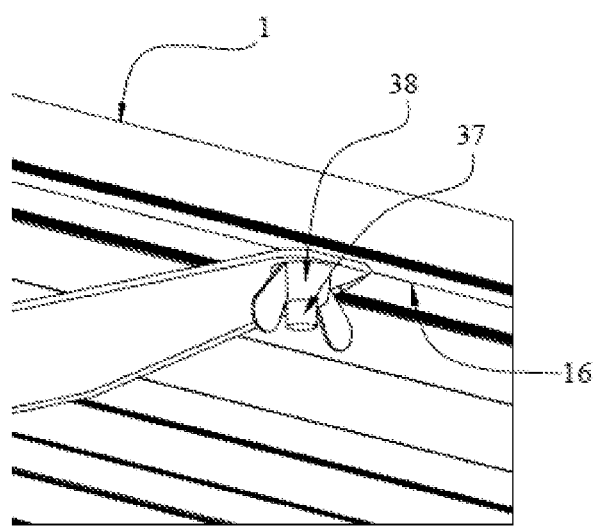
FIG. 12 is a detail of a brace for use with a table conversion kit using the side board panel of the utility tray system of FIG. 1.

FIG. 12 is a close up of the brace of the table conversion kit trestle 39 secured to the sideboard panel 1, utilising a plow bolt 37 and wing nut 38 to achieve clamping onto the sideboard panel 1 for component security.

FIG. 13 is an exploded perspective assembly view of the components utilised in FIG. 12 to achieve component security.

Figure 14:
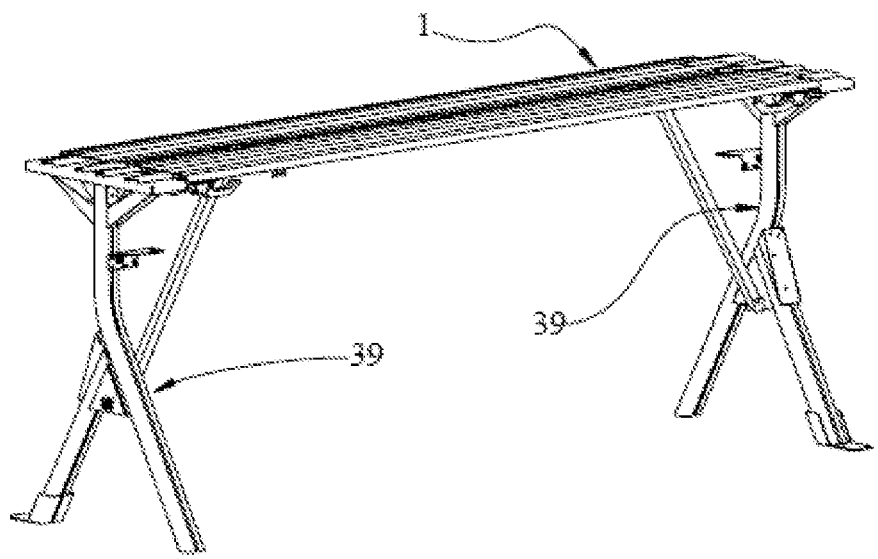
FIG. 14 is a perspective view of the table conversion kit of FIG. 12 assembled.

FIG. 14 is a perspective view of the table conversion kit assembled, utilising a trestle 39 connected to the sideboard panel 1 to form a work bench.

FIG. 15 is a perspective detail depicting how the sideboard panel 1 mounts to the side coaming member 3 with a gudgeon pin hinge 41 and a pair of M8 mounting screws 40.

Although the invention has been described with reference to specific examples, it will be appreciated by those skilled in the art that the invention may be embodied in many other forms.

The claims defining the invention are as follows:

1. A utility tray system comprising:
   coaming members each located on each of two opposing sides of a tray body, each coaming member having at least one longitudinally extending channel, the channel having a longitudinally extending channel opening in communication with a longitudinally extending channel body, the channel body being wider in cross-section than the channel opening;
   wherein the channel body is adapted to receive a fastener which has a portion that is larger in cross sectional area than the channel opening, thereby preventing the fastener from being withdrawn from the channel opening;
   further wherein the fastener can be selectively secured to the coaming member at a selected longitudinal position;
   wherein the at least one channel comprises a first channel disposed in a raised portion of the coaming member that extends upwardly above a deck surface of the tray body, the first channel having a first channel opening facing upward and outwardly from the raised portion of the coaming member.

2. The utility tray system of claim 1, wherein the at least one longitudinally extending channel comprises a second channel having a second channel opening that faces sideways toward a longitudinal centreline of the tray body.

3. The utility tray system of claim 1, further comprising two sideboard panels each located on each of the two opposing sides of the tray body and outside of each of the coaming members.

4. The utility tray system of claim 3, wherein each of the sideboard panels has one or more corresponding like channels.

5. The utility tray system of claim 4, wherein each sideboard panel has a first side and a generally parallel second side, wherein one channel is formed in the first side and two channels are formed in the second side.

6. The utility tray system of claim 5, wherein two channels are located adjacent to each other on the first and second sides adjacent to an edge of each sideboard panel, furthest from a pivot edge of the sideboard panel.

7. The utility tray system of claim 6, wherein the at least one longitudinally extending channel comprises a third channel having a third channel opening facing downward.

8. The utility tray system of claim 6, wherein each sideboard panel is removable from the utility tray system.

9. The utility tray system of claim 3, wherein each sideboard panel is removable from the utility tray system.

10. The utility tray system of claim 9, wherein each sideboard panel is adapted to engage with the channel(s) formed on the sideboard panel with two trestle frames to define a work bench.

11. The utility tray system of claim 1 wherein each channel has a cross-sectional profile generally in the form of an isosceles trapezoid, a shorter side of two parallel sides of the trapezoid defining the channel opening.

12. The utility tray system of claim 11, wherein a longitudinally extending rectangular groove is located beneath a lower side of the trapezoid.

13. The utility tray system of claim 11, further comprising an engagement mechanism adapted to be selectively isolated longitudinally relative to the channel.

14. The utility tray system of claim 13, wherein the engagement mechanism includes a channel nut adapted to be located within the channel, the channel nut having a cross sectional profile in the form of an isosceles trapezoid, having two angled faces, wherein a surface of the channel nut corresponding to a shorter side of two parallel sides of the isosceles trapezoid of the cross-sectional profile is located between the two angled faces and includes a threaded hole adapted to receive a bolt, and the bolt is adapted to extend through the channel opening.

15. The utility tray system of claim 13 wherein the engagement mechanism includes a plow bolt, whereby a threaded stem portion of the plow bolt extends through the channel opening, and a head portion of the plow bolt is wider than the channel opening.

16. The utility tray system of claim 15, further comprising a tray deck, the tray deck being defined by a plurality of interlocking tongue and groove boards.

17. The utility tray system of claim 1, further comprising a ladder rack, the ladder rack having two arms and a central support member, each of the arms having a mounting portion adapted to be secured to one of the at least one channel of one of the coaming members with the fastener.

18. The utility tray system of claim 17, wherein the ladder rack central support member includes a first ladder rack channel.

19. The utility tray system of claim 18, wherein the ladder rack central support member includes a second ladder rack channel on an opposing side of the ladder rack central support member relative to the first ladder rack channel.

20. The utility tray system of claim 1, further comprising a tray deck, the tray deck being defined by a plurality of interlocking tongue and groove boards.

* * * * *